(12) United States Patent
Kudo

(10) Patent No.: US 9,456,124 B2
(45) Date of Patent: Sep. 27, 2016

(54) DETECTION DEVICE, AND IMAGE PICKUP APPARATUS WITH THE SAME

(71) Applicant: CANON KABUSHIKI KAISHA, Tokyo (JP)

(72) Inventor: Hiroshi Kudo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/579,072

(22) Filed: Dec. 22, 2014

(65) Prior Publication Data

US 2015/0189156 A1  Jul. 2, 2015

(30) Foreign Application Priority Data

Dec. 26, 2013 (JP) .................................. 2013-268461

(51) Int. Cl.
*H04N 5/232* (2006.01)
*G02B 7/09* (2006.01)
*G02B 7/10* (2006.01)

(52) U.S. Cl.
CPC ............ *H04N 5/23212* (2013.01); *G02B 7/09* (2013.01); *G02B 7/102* (2013.01)

(58) Field of Classification Search
CPC .......... H04N 5/23212; H04N 5/2254; H04N 5/2253; G02B 7/102; G02B 7/09
See application file for complete search history.

(56) References Cited

U.S. PATENT DOCUMENTS

| | | | |
|---|---|---|---|
| 4,789,891 A * | 12/1988 | Kanayama | H04N 9/097 348/265 |
| 6,483,101 B1 * | 11/2002 | Webster | G02B 7/02 250/216 |
| 7,253,388 B2 * | 8/2007 | Kuhmann | B81C 3/002 250/208.1 |
| 7,515,203 B2 * | 4/2009 | Sato | H04N 5/2253 348/374 |
| 2003/0034569 A1 * | 2/2003 | Caletka | H01L 23/3128 257/796 |
| 2006/0220232 A1 * | 10/2006 | Tanida | H01L 27/14618 257/723 |
| 2012/0104536 A1 * | 5/2012 | Seo | H01L 27/14618 257/459 |
| 2015/0138381 A1 * | 5/2015 | Ahn | G03B 5/00 348/208.2 |

FOREIGN PATENT DOCUMENTS

| | | |
|---|---|---|
| JP | 05-210046 A | 8/1993 |
| JP | 4250235 B2 | 1/2009 |

* cited by examiner

*Primary Examiner* — Timothy J Henn
(74) *Attorney, Agent, or Firm* — Carter, DeLuca, Farrell & Schmidt, LLP

(57) ABSTRACT

A detection device includes a first holding member holding a light receiving element, a second holding member holding an optical system, and first and second fixing members fixing the first and second holding members with the first and second holding members separated from each other, in a direction parallel to a second direction orthogonal to a first direction in which an optical axis of the optical system extends, at least one of a first surface of the first holding member opposite to the second holding member and a second surface of the second holding member opposite to the first holding member has a plane inclined with respect to the first direction, and the first and second fixing members are provided on the inclined plane and disposed between the first and second surfaces.

18 Claims, 4 Drawing Sheets

DETECTION DEVICE, AND IMAGE PICKUP APPARATUS WITH THE SAME

BACKGROUND OF THE INVENTION

1. Field of the Invention

The present invention relates to a detection device that detects an object, and more particularly to a positioning mechanism of a light receiving element and an optical system.

2. Description of the Related Art

Conventionally, an object detection device, such as a focus detection device, provided to an optical device such as a camera has been constituted by a light receiving element that detects an object image, and an optical system, such as a lens, that forms the object image on the light receiving element. In such a configuration, in order to appropriately detect the object image, the light receiving element is positioned with respect to the optical system and fixed to the optical system.

Japanese Patent No. 4250235 discloses a structure in which a supporting member is provided between an optical-system holding member that holds an optical system and a light-receiving-element holding member that holds a light receiving element to position the light receiving element on multiple axes.

However, in the structure disclosed in Japanese Patent No. 4250235, the optical-system holding member and the supporting member, and the supporting member and the light-receiving-element holding member respectively abut against each other, which causes a friction therebetween at the time of positioning the light receiving element. This friction consequently results in a difference between a drive amount instructed at the time of the positioning and an actual drive amount, which makes it difficult to quickly and highly accurately position the light receiving element.

As a solution to this problem, a structure is known in which the optical-system holding member and the light-receiving-element holding member do not contact with each other. This structure in which the optical-system holding member and the light-receiving-element holding member do not contact with each other does not result in the friction, which makes it possible to quickly and highly accurately position the light receiving element.

Japanese Patent Laid-Open No. H5-210046 discloses a fill-in-adhesion structure in which the optical-system holding member and the light-receiving-element holding member do not contact with each other and in which a clearance between them is filled with adhesives to fix them.

However, in the fill-in-adhesion structure disclosed in Japanese Patent Laid-Open No. H5-210046, the positioning of the light receiving element may result in non-uniformity in distance between the optical-system holding member and the light-receiving-element holding member, that is, in length of the adhesives in a clearance direction. In the fill-in-adhesion structure, a change in surrounding hygrothermal environment inevitably causes the filled-in adhesives to expand or shrink. Because of the non-uniformity in length of the adhesives in the clearance direction, the expansion or the shrink of the adhesives causes the optical-system holding member and the light-receiving-element holding member to be acted upon by stresses with mutually different magnitudes applied from the adhesives. This causes the light receiving element to be moved, with respect to the optical system, to a position different from that corresponding to when the light receiving element is fixed with the adhesives, which makes it impossible for the light receiving element to acquire an appropriate object image. That is, the fill-in-adhesion structure disclosed in Japanese Patent Laid-Open No. H5-210046 has a problem that an accuracy in detecting the object decreases due to the change in surrounding hygrothermal environment.

SUMMARY OF THE INVENTION

The present invention provides a detection device and an image pickup apparatus including the detection device that are capable of detecting an object with high accuracy even when surrounding hygrothermal environment is changed.

A detection device as one aspect of the present invention includes a first holding member holding a light receiving element configured to detect an object image, a second holding member holding an optical system configured to form the object image on the light receiving element, a first fixing member fixing the first and second holding members with the first and second holding members separated from each other, and a second fixing member fixing the first and second holding members with the first and second holding members separated from each other, in a direction parallel to a second direction orthogonal to a first direction in which an optical axis of the optical system extends, at least one of a first face of the first holding member opposite to the second holding member and a second surface of the second holding member opposite to the first holding member has a plane inclined with respect to the first direction, and the first and second fixing members are provided on the inclined plane and disposed between the first and second surfaces.

An image pickup apparatus as another aspect of the present invention includes the detection device, and a focusing device configured to perform focusing based on an output from the detection device.

Further features and aspects of the present invention will become apparent from the following description of an exemplary embodiment with reference to the attached drawings.

BRIEF DESCRIPTION OF THE DRAWINGS

FIG. 2A is a perspective view of the positioning mechanism, and FIG. 2B is a cross-sectional view of the positioning mechanism on a $z_2$-$x_2$ plane.

FIGS. 3A, 3B, and 3C are a perspective view, a top view, and an A-A section view of the focus detection device 100, respectively.

FIGS. 4A, 4B, and 4C are diagrams respectively illustrating a state in which the application position of the adhesive 161 has not yet been determined, a state immediately after the adhesive 161 has been applied, and a state immediately after the adhesive 162 has been applied.

DESCRIPTION OF THE EMBODIMENTS

An Exemplary embodiment of the present invention will be described below with reference to the accompanied drawings.

Figure 1:
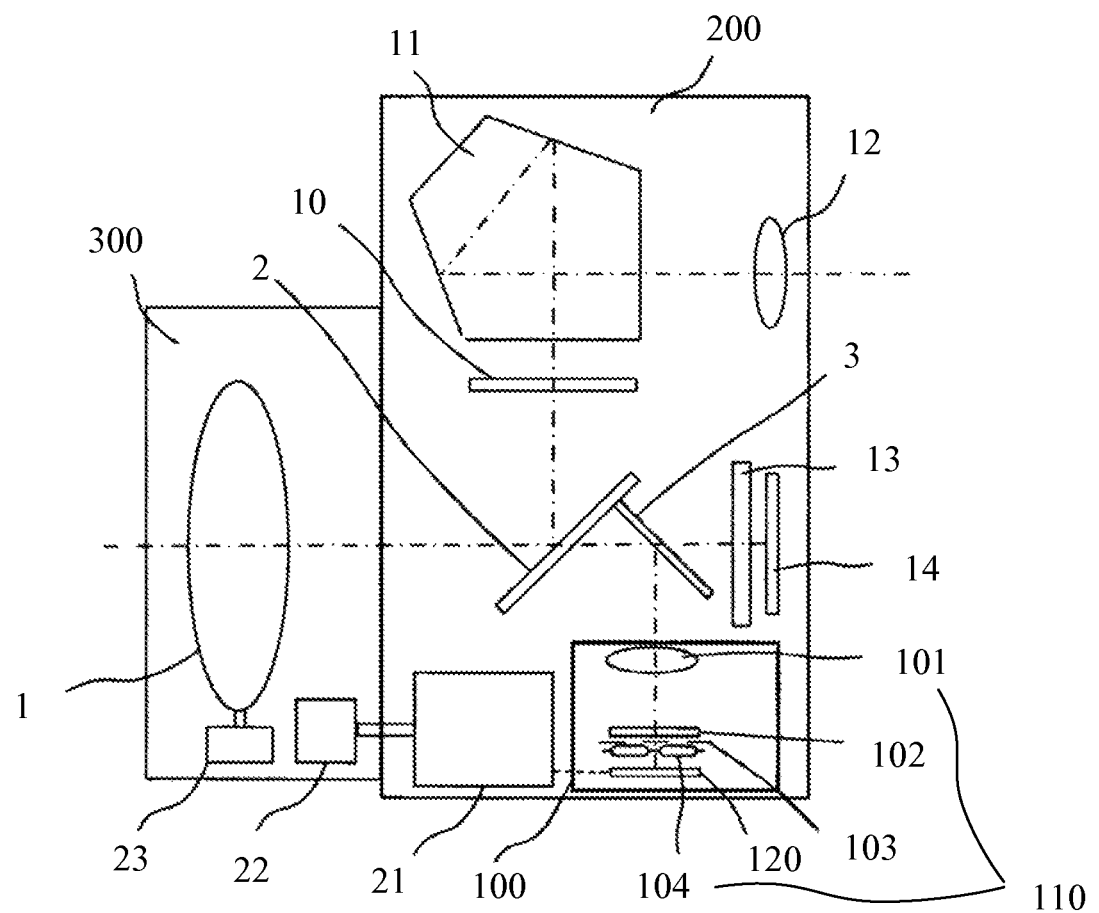
FIG. 1 is a schematic configuration diagram of an optical device (an image pickup apparatus) that is an embodiment of the present invention.

FIG. 1 is a schematic configuration diagram of an optical device (an image pickup apparatus) including an object detection device in an embodiment of the present invention.

In FIG. 1, reference numeral 200 denotes a camera body of the present invention. Reference numeral 300 denotes an interchangeable lens detachably mounted on a mount (not illustrated) fixed to the camera body 200. The interchangeable lens 300 houses an image pickup lens 1.

Reference numerals 2 and 3 denote a main mirror and a sub mirror, respectively. Reference numeral 100 denotes a focus detection device as the object detection device of the present invention.

An image of a light reflected by the main mirror 2 is formed on a focusing plate 10 arranged at a position optically conjugate to an image pickup element 14. A light (an object image) diffused by and transmitted through the focusing plate 10 is converted by a penta prism 11 into an erect image. The erect image is magnified by an eyepiece 12 to be observed by a user.

Reference numerals 13 and 14 denote an optical low-pass filter and an image pickup element, respectively. The optical low-pass filter 13 reduces a false color and a moire of a shot image. The image pickup element 14 is constituted by a photoelectric conversion element, such as a CCD sensor and a CMOS sensor, which photoelectrically converts the object image formed by the image pickup lens 1 to generate an image and outputs an electrical signal. Reference numeral 21 denotes a camera CPU as a controller that controls various calculations and operations performed in a camera.

In the interchangeable lens 300, reference numeral 22 denotes a memory storing various information on the interchangeable lens 300. Reference numeral 23 denotes a focus-lens motor that moves, in an optical axis direction, a focus lens (not illustrated) included in the image pickup lens 1 to cause the focus lens to perform focusing of the image pickup lens 1. Operations of the focus-lens motor 23 are controlled by the camera CPU 21.

Next, a description will be given of detection (focus detection) of a focus state of the image pickup lens 1 that uses a focus detection device 100. A light from an object passes through the image pickup lens 1, and is then incident on the main mirror constituted by a half mirror. Part of the light incident on the main mirror 2 is transmitted through the main mirror 2, reflected by the sub mirror 3, and then incident on a field lens 101 of the focus detection device 100. The field lens 101 condenses the incident light (a light beam).

The light beam transmitted through the field lens 101 passes through an optical filter 102 such as an infrared cut filter, is caused by the stop 103 to pass through a more limited range, and is then incident on a secondary-imaging lens 104. Due to such a function of dividing and limiting a range through which the light beam passes performed by the stop 103, light beams passing through two regions located in an exit pupil of the image pickup lens 1 are incident on the secondary-imaging lens 104. The field lens 101 and the secondary-imaging lens 104 constitute a focus detection optical system 110 (i.e., an optical system that forms the object image on a light receiving element).

The secondary-imaging lens 104 causes the two incident light beams to be reimaged on a focus detection sensor 120 (i.e., the light receiving element that detects the object image), which is the image pickup element to be used for the focus detection. This means that the light beams from the two pupil-divided regions form the object images, which are a pair of optical images, on the focus detection sensor 120.

The focus detection sensor 120 photoelectrically converts the pair of object images to output a pair of image signals.

The camera CPU 21 performs a correlation calculation for the pair of image signals to calculate a phase difference indicating their relative positional displacement, and calculates the focus state (a defocus amount) of the image pickup lens 1 based on the phase difference. The camera CPU 21 calculates, based on the defocus amount, an amount by which the focus lens is to be moved to acquire an in-focus state. Then, the camera CPU 21 drives, depending on a result of the calculation, the focus-lens motor 23 to cause the focus lens to be moved and thereby perform the focusing to acquire the in-focus state. In other words, the image pickup apparatus of the present invention includes a focusing device (i.e., the focus-lens motor 23, and the like) that performs the focusing based on the output from the focus detection device 100.

After the focus detection and the focusing, both described above, are performed, the camera CPU 21 causes the main mirror 2 and the sub mirror 3 to retract out of an optical path. This causes the light from the image pickup lens 1 to reach the image pickup element 14 via the optical filter 13 and to form an object image on the image pickup element 14. The image pickup element 14 photoelectrically converts the object image. The camera CPU 21 generates an image based on the electrical signal sent from the image pickup element 14, and stores the generated image in a recording medium.

Next, referring to FIGS. 2A to 4C, a description will be given of a positioning mechanism of the focus detection device 100 in the embodiment of the present invention. Each of FIGS. 2A to 4C is a schematic configuration diagram illustrating the positioning mechanism of the focus detection device 100 in the embodiment of the present invention.

Figure 2A:
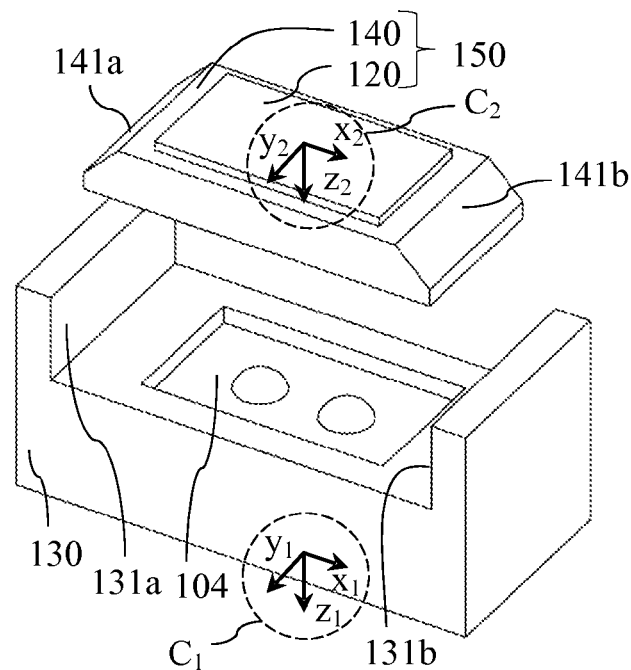
FIGS. 2A and 2B are schematic configuration diagrams of a positioning mechanism of a focus detection device 100 in positioning a focus detection sensor 120.
Figure 2B:
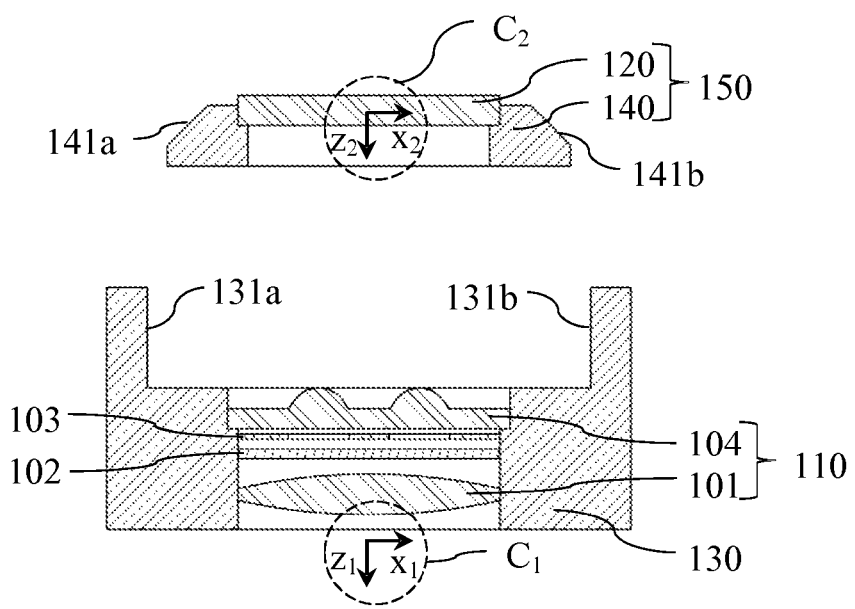

FIGS. 2A and 2B are schematic configuration diagrams of the focus detection device 100 in positioning a focus detection sensor 120. FIG. 2A is a perspective view, and FIG. 2B is a sectional view of a $z_2$-$x_2$ plane of a coordinate system $C_2$ described later.

Reference numeral 130 denotes a body block (a second holding member), which is a holding member, that holds the focus detection optical system 110 and blocks a light coming from the outside. Reference numeral 140 denotes a sensor holder (a first holding member) that holds the focus detection sensor 120.

In FIG. 2A, symbol $C_1$ denotes a coordinate system of the focus detection optical system 110, and symbol $C_2$ denotes the coordinate system of the focus detection sensor 120. An optical axis of the focus detection optical system 110, and an optical axis of the focus detection sensor 120 are defined as a "$z_1$ axis" of the coordinate system $C_1$, and a "$z_2$ axis" (a first direction in which the optical axis of the optical system extends) of the coordinate system $C_2$, respectively. In addition, on the coordinate system $C_2$ of the focus detection sensor 120, a straight line vertical to the $z_2$ axis and parallel to rows (a so-called correlation direction) of the light receiving elements arrayed along a longitudinal direction of the focus detection sensor 120 is defined as a "$x_2$ axis" (a direction parallel to a second direction orthogonal to the first direction). On the coordinate system $C_1$ of the focus detection optical system 110, a direction that is vertical to the $z_1$ axis and in which the image is separated by the secondary-imaging lens 104 (that is, a direction parallel to the correlation direction after the positioning) is defined as an "$x_1$ axis". On the coordinate system $C_1$, a direction vertical to both the $z_1$ axis and the $x_1$ axis is defined as a $y_1$ axis. On the coordinate system $C_2$, a direction vertical to both the $z_2$ axis and the $x_2$ axis is defined as a $y_2$ axis (a third direction orthogonal to both the first direction and the second direction).

The focus detection sensor 120 is positioned by causing an external portion of the focus detection sensor 120 to strike a sensor holder 140, and is fixed with an adhesive. Reference numeral 150 denotes a sensor unit constituted by the focus detection sensor 120 and the sensor holder 140 that are integrated with each other. The focus detection sensor 120 is positioned, as the sensor unit 150, with respect to the focus detection optical system 110.

Since the focus detection sensor 120 can be positioned by electrical adjustment with respect to the focus detection optical system 110 in a $z_2$ direction, it is not essential to finely position the focus detection sensor 120 on the positioning mechanism. Therefore, the position and an attitude of the focus detection sensor 120 with respect to the focus detection optical system 110 are adjusted to be the same on each of the five axes except for the $z_2$ direction.

The body block 130 and the sensor holder 140 are fixed to each other by an ultraviolet cure adhesive (a fixing member). More specifically, the body block 130 and the sensor holder 140 are fixed to each other by the ultraviolet cure adhesive, with the body block 130 and the sensor holder 140 located away (separated) from each other (a non-contact state). As illustrated in FIG. 3C, the sensor holder 140 has, when fixed by the adhesive, a first face (surface) opposite to the body block 130 in the $x_2$ direction. The body block 130 has a second face (surface) opposite to the sensor holder 140 in the $x_2$ direction. In addition, the sensor holder 140 has adhesive-applied regions 141a and 141b on the first face, and the body block 130 has adhesive-applied regions 131a and 131b on the second face. The adhesives are arranged between the first and second faces, and are respectively applied to a portion of a space located between the adhesive-applied regions 131a and 141a and to portion of a space located between the adhesive-applied regions 131b and 141b. A shape of each of the adhesive-applied regions 131a and 131b of the body block 130 is a flat plane approximately parallel to the $y_1$-$z_1$ plane. The expression "approximately parallel" as used herein includes a case where the adhesive-applied regions 131a and 131b are perfectly parallel to the $y_1$-$z_1$ plane, and a case where the regions are different from the perfectly-parallel state within a permissible tolerance. The expression "approximately vertical" described below has a meaning similar to as described above. A shape of each of the adhesive-applied regions 141a and 141b of the sensor holder 140 is a plane being approximately parallel to the $y_2$ axis and having an inclination along the $z_2$ direction. While a description will be given here of an example in which the second face has an approximately parallel plane and the first face is a plane having the inclination, the first face and the second face may alternatively have the approximately parallel plane and the plane having the inclination, respectively, as described later. In addition, each of the first face and the second face may be the plane having the inclination. In other words, at least one of the first and second faces has the plane inclined with respect to the $z_2$ direction. Incidentally, at least one of them has the plane inclined in the $z_2$ direction such that a distance between the first and second faces becomes wider from an object side to an image-plane side. The adhesives are provided on the inclined plane and disposed between the first and second faces.

Figure 3A:
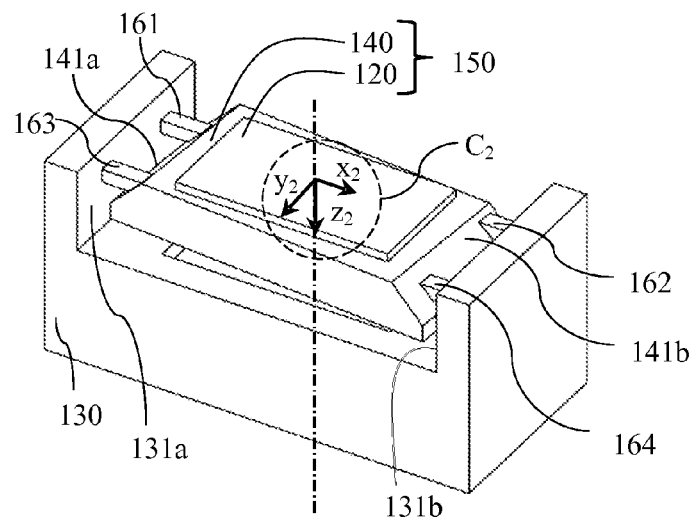
FIGS. 3A to 3C are schematic configuration diagrams of the focus detection device 100 after positioning the focus detection sensor 120.
Figure 3B:
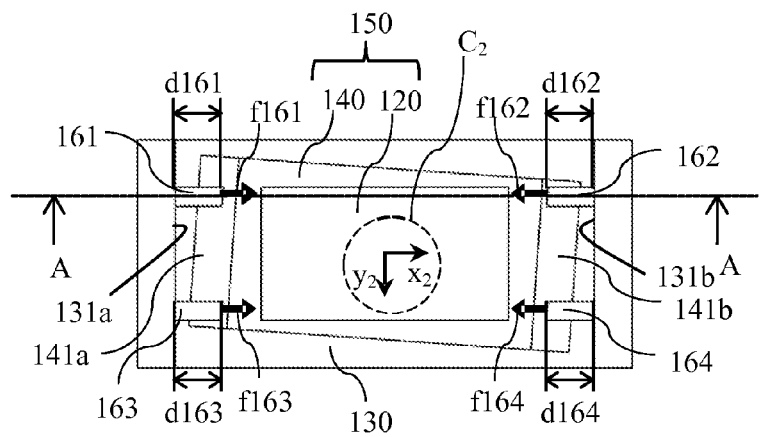
Figure 3C:
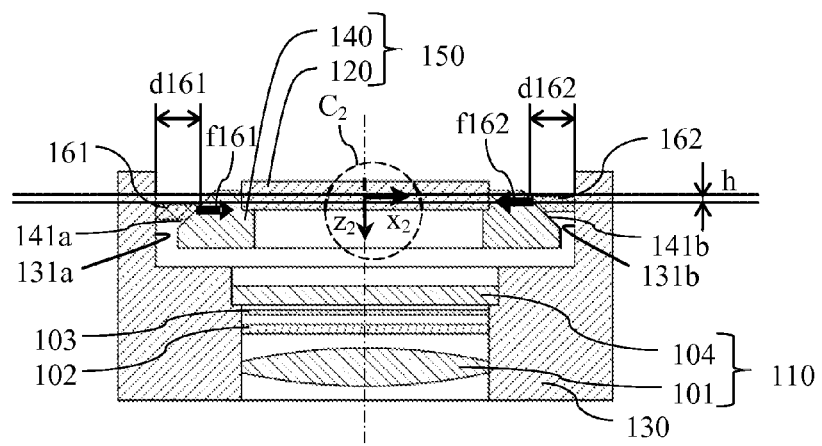

FIGS. 3A to 3C are schematic configuration diagrams of the focus detection device 100 after the focus detection sensor 120 is positioned. FIGS. 3A, 3B, and 3C are a perspective view, a top view, and an A-A sectional view of the focus detection sensor 120, respectively. Since the five axes except for the $z_2$ axis are the same on both the coordinate systems $C_1$ and $C_2$ after the focus detection sensor 120 is positioned, a description will be continued using the coordinate system $C_2$.

Reference numerals 161 to 164 denote adhesives for fixing the body block 130 and the sensor holder 140 to each other. Reference numerals d161 to d164 denote distances between the adhesive-applied regions 131a and 141a and between the adhesive-applied regions 131b and 141b at corresponding adhesion points. Each of the distances is equal to a length in the $x_2$ direction of corresponding one of the adhesives 161 to 164 having been applied. The "lengths d161 to d164 of the adhesives 161 to 164 in the $x_2$ direction" as used herein are referred to as those with a maximum value in the $x_2$ direction. Reference numerals f161 to f164 denote stresses applied to the sensor unit 150 due to expansion or shrink of the adhesives 161 to 164 that is caused by a change in surrounding hygrothermal environment.

As illustrated in FIG. 3A, the adhesives 161 and 163, and the adhesives 162 and 164 are applied by a dispenser (not illustrated) to a space between the adhesive-applied regions 131a and 141a and to a space between the adhesive-applied regions 131b and 141b, respectively. Thereafter, the adhesives 161 to 164 are hardened by ultraviolet irradiation, which makes the body block 130 and the sensor holder 140 fixed to each other by the adhesives.

As illustrated in FIG. 3B, in the present invention, $x_2$ and $y_2$ coordinates of application positions of the adhesives 161 to 164 are constant. The $y_2$ coordinates of the application positions of the adhesives 161 and 162 are approximately equal to each other, and the $y_2$ coordinates of the application positions of the adhesives 163 and 164 are also approximately equal to each other. The expression "approximately equal" as used herein includes a case where the $y_2$ coordinates of the application positions of the corresponding pairs of adhesives are perfectly equal to each other, and a case where the $y_2$ coordinates are different from those of the case where the $y_2$ coordinates are perfectly equal to each other. In other words, first fixing members (the adhesives 161 and 163) are arranged at the same (approximately equal) positions as those of second fixing members (the adhesives 162 and 164) in the $y_2$ direction. The lengths of the first fixing members (the adhesives 161 and 163) in the $x_2$ direction are the same as (approximately equal to) those of the second fixing members (the adhesives 162 and 164) in the $x_2$ direction. On the other hand, as illustrated in FIG. 3C, $z_2$ coordinates of the application positions of the adhesives 161 to 164 are different (indicated by symbol h) depending on the position and the attitude of each of the sensor holder 140 and the body block 130. In other words, the first fixing member (for example, the adhesive 161) is arranged in the $z_2$ direction at a position different from that of the second fixing member (for example, the adhesive 162). Specifically, the $z_2$ coordinates of the adhesives 161 to 164 are located at positions at which the distances d161 to d164 are approximately equal to one another. As illustrated in the drawing, the first fixing members (161 and 163) are provided to the focus detection sensor 120 on a side opposite to that on which the second fixing members (162 and 164) are provided.

Since the lengths of the adhesives 161 to 164 in the $x_2$ direction are approximately equal to one another, magnitudes of the stresses f161 to f164 generated due to the change in surrounding hygrothermal environment are also approximately equal to one another. Similarly, since the $y_2$ coordinates of points of application of the stresses f161 and f162 are approximately equal to each other, the $y_2$ coordinates of the points of application of the stresses f163 and f164 are also approximately equal to each other. Since directions of the stresses f161 to f164 are approximately vertical to the $y_2$ axis, moments of forces respectively generated by the stresses f161 and f162 and the stresses f163 and f164 about $z_2$ axis and applied to the sensor unit 150 are cancelled out. Therefore, the sum of the moments of the forces is zero. For this reason, the sensor unit 150 including the focus detection sensor 120 does not rotate about the $z_2$ axis.

Figure 4A:
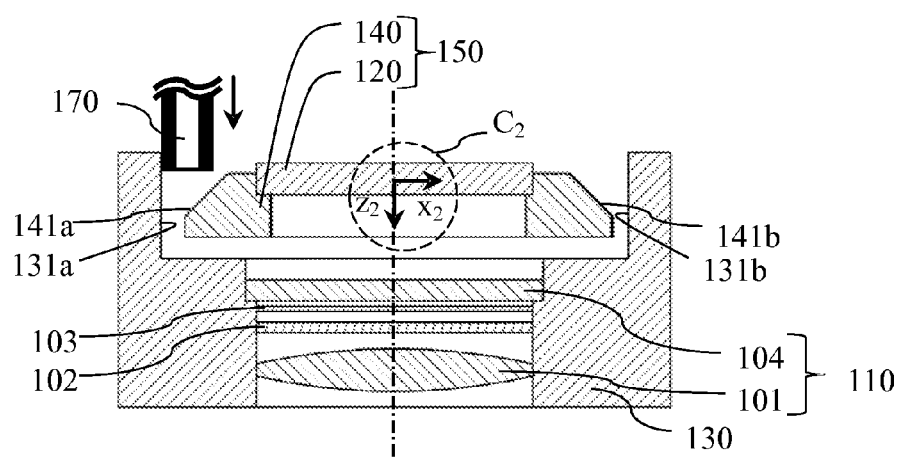
FIGS. 4A to 4C are explanatory diagrams of a process of determining application positions of adhesives 161 to 164, each of which is the A-A section view of the focus detection device 100.
Figure 4B:
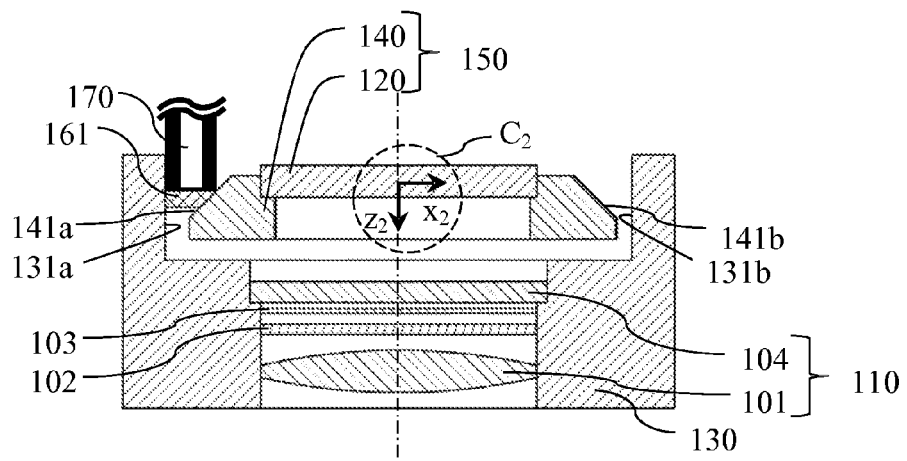
Figure 4C:
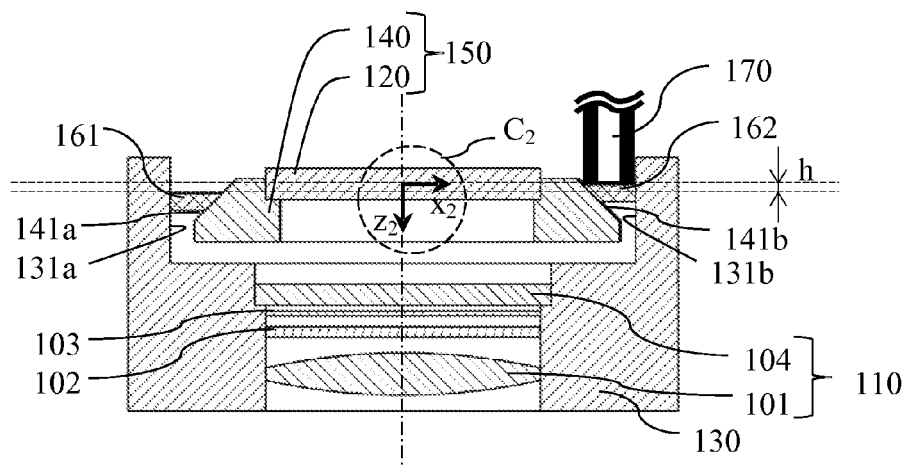

FIGS. 4A to 4C are A-A sectional views illustrating a process of determining the $z_2$ coordinates of the application positions of the adhesives 161 to 164 in the focus detection device 100 illustrated in FIGS. 3A to 3C. FIG. 4A illustrates a state of the focus detection device 100 in which the focus detection sensor 120 has been positioned and the application position of the adhesive 161 has not yet been determined, FIG. 4B illustrates a state of the focus detection device 100 immediately after the adhesive 161 has been applied, and FIG. 4C illustrates a state of the focus detection device 100 immediately after the adhesive 162 has been applied.

A description will be given of a case where the adhesives 161 to 164 are applied in this order.

Reference numeral 170 denotes a needle of the dispenser that applies the adhesives 161 to 164 (i.e., a supplying member that supplies the adhesives).

As illustrated in FIG. 4A, the needle 170 of the dispenser goes down toward the $z_2$ direction indicated by an arrow drawn in the drawing until the needle 170 comes into contact with the adhesive-applied region 141a of the sensor holder 140. The contact is detected by, for example, using a force sensor attached to the dispenser. Upon the detection of the contact, the needle 170 of the dispenser stops, and, as illustrated in FIG. 4B, applies the adhesive 161. Thereafter, the needle 170 of the dispenser goes up to the application position of the subsequent adhesive 162. The $z_2$ coordinate of the application position of the adhesive 162 is similarly determined, and the adhesive 162 is applied as illustrated in FIG. 4C. Thereafter, similarly, the $z_2$ coordinates of the application positions of the adhesives 163 and 164 are determined, and then the adhesives 163 and 164 are applied. In other words, the needle 170 (a tip portion or an end portion) having a predetermined width (a first width) abuts against the first and second faces, thereby positioning the adhesives 161 to 164 in the $z_2$ direction.

Determining the $z_2$ coordinates of the application positions of the adhesives 161 to 164 by using the above-described process enables making the lengths of the adhesives 161 to 164 in the $x_2$ direction approximately equal to one another. For this reason, the sensor unit 150 including the focus detection sensor 120 does not rotate about the $z_2$ axis.

As described above, since the focus detection sensor 120 can acquire an appropriate object image even in the case of the change in surrounding hygrothermal environment, the embodiment can provide the high-accuracy focus detection device 100.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

In the above-described embodiment, the adhesive-applied regions 141a and 141b are the flat planes having the inclination each as a shape that changes with a change in position of the light receiving element in the optical axis direction. However, the present invention is not limited to this, and the adhesive-applied regions 131a and 131b may have a shape with the inclination. In addition, the adhesive-applied regions 131a and 131b may be curved planes instead of the flat planes. Furthermore, while the object detection device has been described with an example being the focus detection device 100, the embodiment may be applied also to a photometry device that acquires information such as a brightness of an object, and to an object detection device such as an image pickup apparatus. Moreover, while the optical device using the object detection device has been described with an example being a single-lens reflex camera, the embodiment may be applied also to an optical apparatus such as a video camera and a compact digital camera.

This application claims the benefit of Japanese Patent Application No. 2013-268461, filed on Dec. 26, 2013, which is hereby incorporated by reference herein in its entirety.

What is claimed is:

1. A detection device comprising:
a first holding member holding a light receiving element, the light receiving element being configured to detect an object image;
a second holding member holding an optical system, the optical system being configured to form the object image on the light receiving element;
a first fixing member fixing the first and second holding members, with the first and second holding members separated from each other; and
a second fixing member fixing the first and second holding members, with the first and second holding members separated from each other,
wherein, in a direction parallel to a second direction orthogonal to a first direction in which an optical axis of the optical system extends, at least one of a first surface of the first holding member opposite to the second holding member and a second surface of the second holding member opposite to the first holding member has a plane inclined with respect to the first direction,
wherein the first and second fixing members are provided on the inclined plane and disposed between the first and second surfaces,
wherein the first surface has the inclined plane, and
wherein the second surface has a plane parallel to the first direction.

2. The detection device according to claim 1,
wherein the first fixing member is located at the same position as a position of the second fixing member in a third direction orthogonal to the first direction and the second direction, and
wherein a length of the first fixing member in the direction parallel to the second direction is the same as a length of the second fixing member in the direction parallel to the second direction.

3. The detection device according to claim 1,
wherein the first fixing member is disposed at a position different from a position of the second fixing member in the first direction.

4. The detection device according to claim 1,
wherein at least one of the first surface and the second surface has the plane inclined with respect to the first direction such that a distance between the first and second surfaces becomes wider from an object side to an image plane side.

5. The detection device according to claim 1,
wherein the inclined plane is a flat plane or a curved plane.

6. The detection device according to claim 1,
wherein the first fixing member is provided opposite to the second fixing member with respect to the light receiving element.

7. The detection device according to claim 1,
wherein the first and second fixing members are adhesives, and
wherein an end portion with a predetermined width of a supplying member that supplies the adhesives abuts against the first and second surfaces to position the first and second fixing members in the first direction.

8. The detection device according to claim 1,
wherein the optical system is a focus detection optical system, and
wherein the light receiving element is configured to detect a pair of object images.

9. An image pickup apparatus comprising:
a detection device; and
a focusing device configured to perform focusing based on an output from the detection device,
wherein the detection device includes:
a first holding member holding a light receiving element, the light receiving element being configured to detect an object image;
a second holding member holding an optical system, the optical system being configured to form the object image on the light receiving element;
a first fixing member fixing the first and second holding members with the first and second holding members separated from each other; and
a second fixing member fixing the first and second holding members with the first and second holding members separated from each other,
wherein, in a direction parallel to a second direction orthogonal to a first direction in which an optical axis of the optical system extends, at least one of a first surface of the first holding member opposite to the second holding member and a second surface of the second holding member opposite to the first holding member has a plane inclined with respect to the first direction,
wherein the first and second fixing members are provided on the inclined plane and disposed between the first and second surfaces,
wherein the first surface has the inclined plane, and
wherein the second surface has a plane parallel to the first direction.

10. A detection device comprising:
a first holding member holding a light receiving element, the light receiving element being configured to detect an object image;
a second holding member holding an optical system, the optical system being configured to form the object image on the light receiving element;
a first fixing member fixing the first and second holding members, with the first and second holding members separated from each other; and
a second fixing member fixing the first and second holding members, with the first and second holding members separated from each other,
wherein, in a direction parallel to a second direction orthogonal to a first direction in which an optical axis of the optical system extends, at least one of a first surface of the first holding member opposite to the second holding member and a second surface of the second holding member opposite to the first holding member has a plane inclined with respect to the first direction,
wherein the first and second fixing members are provided on the inclined plane and disposed between the first and second surfaces,
wherein the first surface has a plane parallel to the first direction, and
wherein the second surface has the plane inclined with respect to the first direction.

11. The detection device according to claim 10,
wherein the first fixing member is located at the same position as a position of the second fixing member in a third direction orthogonal to the first direction and the second direction, and
wherein a length of the first fixing member in the direction parallel to the second direction is the same as a length of the second fixing member in the direction parallel to the second direction.

12. The detection device according to claim 10,
wherein the first fixing member is disposed at a position different from a position of the second fixing member in the first direction.

13. The detection device according to claim 10,
wherein at least one of the first surface and the second surface has the plane inclined with respect to the first direction such that a distance between the first and second surfaces becomes wider from an object side to an image plane side.

14. The detection device according to claim 10,
wherein the inclined plane is a flat plane or a curved plane.

15. The detection device according to claim 10,
wherein the first fixing member is provided opposite to the second fixing member with respect to the light receiving element.

16. The detection device according to claim 10,
wherein the first and second fixing members are adhesives, and
wherein an end portion with a predetermined width of a supplying member that supplies the adhesives abuts against the first and second surfaces to position the first and second fixing members in the first direction.

17. The detection device according to claim 10,
wherein the optical system is a focus detection optical system, and
wherein the light receiving element is configured to detect a pair of object images.

18. An image pickup apparatus comprising:
a detection device; and
a focusing device configured to perform focusing based on an output from the detection device,
wherein the detection device includes:
a first holding member holding a light receiving element, the light receiving element being configured to detect an object image;
a second holding member holding an optical system, the optical system being configured to form the object image on the light receiving element;
a first fixing member fixing the first and second holding members with the first and second holding members separated from each other; and
a second fixing member fixing the first and second holding members with the first and second holding members separated from each other,
wherein, in a direction parallel to a second direction orthogonal to a first direction in which an optical axis of the optical system extends, at least one of a first surface of the first holding member opposite to the second holding member and a second surface of the second holding member opposite to the first holding member has a plane inclined with respect to the first direction,
wherein the first and second fixing members are provided on the inclined plane and disposed between the first and second surfaces,
wherein the first surface has a plane parallel to the first direction, and
wherein the second surface has the plane inclined with respect to the first direction.

* * * * *